UNITED STATES PATENT OFFICE.

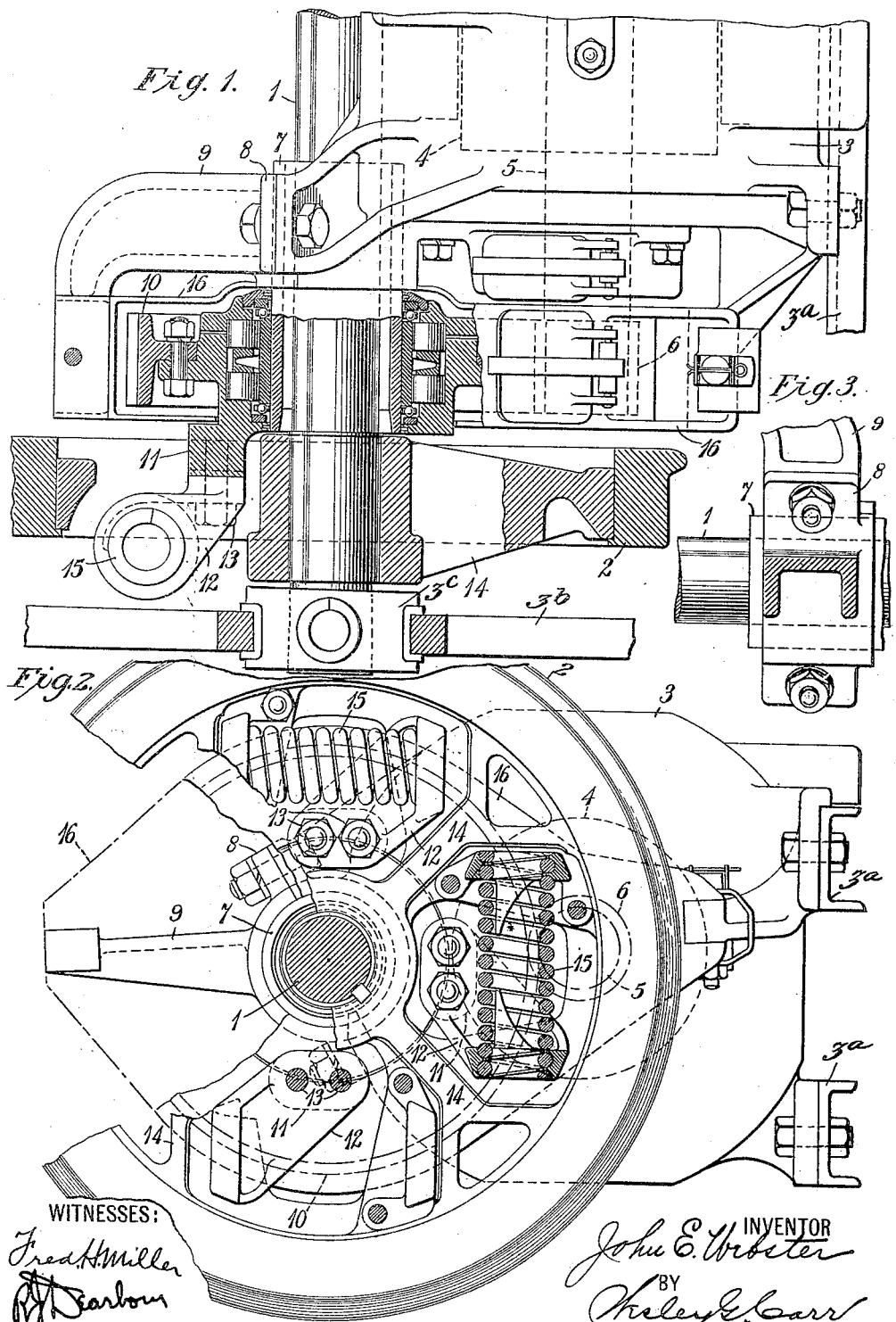

JOHN E. WEBSTER, OF PITTSBURGH, PENNSYLVANIA, ASSIGNOR TO WESTINGHOUSE ELECTRIC AND MANUFACTURING COMPANY, A CORPORATION OF PENNSYLVANIA.

RESILIENT DRIVING CONNECTION.

1,126,143. Specification of Letters Patent. Patented Jan. 26, 1915.

Application filed May 27, 1912. Serial No. 700,036.

*To all whom it may concern:*

Be it known that I, JOHN E. WEBSTER, a citizen of the United States, and a resident of Pittsburgh, in the county of Allegheny and State of Pennsylvania, have invented a new and useful Improvement in Resilient Driving Connections, of which the following is a specification.

My invention relates to yielding connections and particularly to such resilient driving connections as are interposed between the propelling motors and the driving wheels of electric vehicles.

In reissued Patent No. 13,165, granted November 8, 1910, to the Westinghouse Electric & Manufacturing Company, on a reissue application filed by me June 25, 1910, is shown and described a resilient connection adapted for the purposes outlined above and comprising, in general, helical springs interposed between two relatively movable members and provided with means for circumferentially gripping convolutions of the springs and clamping the same to the respective members.

The object of my present invention is to provide a simple and relatively inexpensive driving connection of the class above specified that shall be specially adapted for use in street and interurban car service between a car wheel and a driving motor.

Resilient driving connections have hitherto been utilized extensively on locomotives and other railway vehicles having relatively large driving wheels. Driving connections of this character have not however been used to any material extent on street cars and other relatively light electrically propelled vehicles by reason of their expense.

It has been my aim to secure the advantages of resilient driving connections for street car and other light railway service and, at the same time, to avoid the expense and the disadvantages which would be involved if the resilient driving structures of the prior art were utilized in this class of service.

In carrying out my invention, I prefer to rigidly support a short sleeve or quill in the motor frame and yieldingly connect one of the car wheels to a suitable gear wheel rotatably mounted on the outer end of the short sleeve or quill. The wheel axle extends loosely through the sleeve or quill and the motor pinion meshes with the gear teeth in the usual manner. The motor frame is rigidly supported on the truck frame and the truck frame is supported on suitable journal boxes located beyond the wheels at the respective ends of the axle.

Figure 1 of the accompanying drawing is a partially sectional plan view of the portion of a motor truck embodying my resilient driving connection. Fig. 2 is an elevation of the motor shown in Fig. 1, and Fig. 3 is a detail view of the quill bearing of the other figures.

Referring to the drawings, a car axle 1 having the usual driving wheels 2, only one of which is shown, is equipped with an electric driving motor 3 having an armature 4, a shaft 5 and a pinion 6. The driving motor 3 is rigidly secured to cross members $3^a$ which constitute parts of a truck frame that also embodies side members $3^b$, the latter being provided with and resiliently supported upon journal boxes $3^c$ that are associated with the axles 1 in accordance with well known practice.

A short quill, or sleeve 7, which loosely surrounds the axle 1 is mounted in a clamp or bracket 8 which is provided in a projection or extension 9 of the motor frame and corresponds to the usual axle bearing of the motor. A gear wheel 10 is rotatively mounted on the quill or sleeve 7, adjacent to one of the wheels 2, and is provided with a plurality of lateral projections 11, to which arms 12 are secured by bolts 13. The arms 12 extend between spokes 14 of the wheel and driving springs 15 are tangentially interposed between the wheel spokes and the arms, their center lines being perpendicular to centrally disposed radial planes. (See Fig. 2). While a plurality of springs will, of course, be employed for each wheel to constitute a complete driving connection, each pair of them is similarly supported and symmetrically arranged so that I deem it unnecessary to describe or illustrate more than one pair. The projection 9 of the motor frame is extended to support a gear case 16, and the clamp or bracket 8 is divided in order that the motor may be removed from the axle without removing one of the wheels.

In mounting the gear wheel 10 on the short sleeve or quill 7, I prefer to employ some suitable roller-bearing structure or combination of rollers and balls such as that shown in Fig. 1, but other bearing structures may, of course, be substituted therefor. The gear wheel 10 may be rigidly secured to the short sleeve or quill 7 and the latter rotatively mounted in the motor frame projection as a substitute for the reverse arrangement shown in the drawings. I have illustrated only one-half of the wheel axle and the corresponding portion of the motor, since the resilient driving connection is employed at one end only. My invention is, of course, not restricted to this arrangement and a corresponding connection may be provided at the opposite end of the axle, although such an arrangement would largely defeat the objects of the invention and unnecessarily complicate the structure.

A great many advantages may be secured by using the structure of my invention instead of the usual street car drive, in which the driving gear is mounted directly on the axle. Among these, perhaps the most important are the following: The distance between centers of the gear and pinion is maintained through the life of the structure and is not in any way affected by any irregularities which may exist in the track or in the wheel. The yielding connection between the wheels and the motor shaft permits the motor armature to start from rest and move through a material angle before the wheels start rotating and, therefore, the motor is relieved from many strains and stresses to which it would otherwise be subjected.

I do not wish to be limited to any particular bearing structure for the quill or sleeve nor to the structural details illustrated.

I claim as my invention:

1. In combination with a truck frame for railway vehicles, a driving motor having a rotatable shaft and a frame rigidly secured to the truck frame, a wheel axle on which the truck frame is resiliently supported, a short quill loosely surrounding the axle near one of the wheels and rigidly secured to the motor frame in parallelism with the motor shaft, a pinion on the motor shaft, a gear wheel meshing with the pinion and rotatably mounted on the short quill, rigid arms extending from the gear wheel between the spokes of the adjacent axle wheel, and springs interposed between the arms and the spokes, whereby a resilient driving connection is established between the motor shaft and the wheel axle through only one of the axle wheels.

2. In combination with a truck frame for railway vehicles, a driving motor having a rotatable shaft and a frame rigidly secured to the truck frame, a wheel axle on which the truck frame is resiliently supported, a short quill loosely surrounding the axle near one of the wheels and rigidly secured to the motor frame in parallelism with the motor shaft, and a yielding gearing connection between said motor shaft and said axle, one element thereof being rotatably mounted upon said quill.

3. In a driving connection, the combination with a truck frame, a motor mounted thereon and having a driving shaft and pinion, a short bearing quill rigidly clamped to said motor and a driving axle projecting through said quill and supporting said truck frame, of a gear rotatably mounted upon said quill and a driving wheel secured to said axle and resiliently associated with said gear.

4. In a vehicle truck, the combination with a truck frame, a motor rigidly mounted thereon, a short bearing quill rigidly secured to one end of said motor and a driving axle projecting loosely through said quill and having wheels associated therewith, of means for resiliently supporting said truck frame upon said axle and a flexible driving connection between said motor and one of said wheels, one element of said connection being rotatably mounted upon said bearing quill.

5. In a driving connection, the combination with a motor having a shaft, a short bearing quill, means for detachably and rigidly clamping one end of said quill to one end of said motor and a driving axle projetcing freely through said quill, of a yielding gear connection between said motor shaft and said axle, one element of said yielding connection being rotatably mounted upon the free end of said quill.

In testimony whereof, I have hereunto subscribed my name this 18th day of May, 1912.

JOHN E. WEBSTER.

Witnesses:
I. De Kaiser,
B. B. Hines.